US008066416B2

(12) United States Patent
Bucher

(10) Patent No.: US 8,066,416 B2
(45) Date of Patent: Nov. 29, 2011

(54) HEAD LAMP ASSEMBLY AND ACCENT LIGHTING THEREFOR

(75) Inventor: Lloyd Keith Bucher, Cookeville, TN (US)

(73) Assignee: Federal-Mogul Ignition Company, Southfield, MI (US)

( * ) Notice: Subject to any disclaimer, the term of this patent is extended or adjusted under 35 U.S.C. 154(b) by 208 days.

(21) Appl. No.: 12/480,188

(22) Filed: Jun. 8, 2009

(65) Prior Publication Data

US 2010/0008101 A1  Jan. 14, 2010

Related U.S. Application Data

(60) Provisional application No. 61/059,854, filed on Jun. 9, 2008.

(51) Int. Cl.
*F21V 9/00* (2006.01)

(52) U.S. Cl. .................. 362/511; 362/510; 362/555

(58) Field of Classification Search .................. 362/555, 362/511, 510
See application file for complete search history.

(56) References Cited

U.S. PATENT DOCUMENTS

| | | | |
|---|---|---|---|
| 5,931,566 A | 8/1999 | Fraizer | |
| 6,107,916 A * | 8/2000 | Beck et al. | 340/468 |
| 6,504,477 B1 * | 1/2003 | Lin | 340/472 |
| 6,789,929 B1 * | 9/2004 | Doong et al. | 362/511 |
| 6,910,783 B2 * | 6/2005 | Mezei et al. | 362/615 |
| 6,965,205 B2 | 11/2005 | Piepgras et al. | |
| 7,088,040 B1 | 8/2006 | Ducharme et al. | |
| 7,161,313 B2 | 1/2007 | Piepgras et al. | |
| 7,186,003 B2 | 3/2007 | Dowling et al. | |
| 7,216,997 B2 | 5/2007 | Anderson, Jr. | |
| 7,238,304 B2 | 7/2007 | Odaki | |
| 7,407,311 B2 * | 8/2008 | Yang | 362/555 |
| 7,549,782 B2 * | 6/2009 | Ng et al. | 362/555 |
| 2006/0087826 A1 | 4/2006 | Anderson, Jr. | |
| 2006/0091778 A1 | 5/2006 | Setlur et al. | |
| 2006/0097245 A1 | 5/2006 | Aanegola et al. | |
| 2006/0214577 A1 | 9/2006 | Byrne et al. | |
| 2007/0206375 A1 | 9/2007 | Piepgras et al. | |
| 2007/0221049 A1 | 9/2007 | Harris | |
| 2007/0240346 A1 | 10/2007 | Li et al. | |
| 2007/0253212 A1 | 11/2007 | Ishida | |
| 2008/0291685 A1 | 11/2008 | Misawa et al. | |

* cited by examiner

*Primary Examiner* — Robert May
(74) *Attorney, Agent, or Firm* — Robert L. Stearns; Dickinson Wright PLLC

(57) ABSTRACT

A head lamp assembly having a main functional head lamp and a UV LED light source configured to direct UV light through a decorative accent light pipe is provided. The light pipe extends at least partially about the functional head lamp, wherein the light pipe has a phosphor coated surface to convert the UV light traveling through the light pipe into visible, luminous light. The visible light is emitted from the light pipe to provide the desired decorative appearance about the functional head lamp.

10 Claims, 2 Drawing Sheets

US 8,066,416 B2

HEAD LAMP ASSEMBLY AND ACCENT LIGHTING THEREFOR

CROSS-REFERENCE TO RELATED APPLICATION

This application claims the benefit of U.S. Provisional Application Ser. No. 61/059,854, filed Jun. 9, 2008, which is incorporated herein by reference in its entirety.

BACKGROUND OF THE INVENTION

1. Technical Field

This invention relates generally to vehicle head lamp assemblies, and more particularly to vehicle head lamp assemblies having decorative accent lighting.

2. Related Art

Vehicle head lamp assemblies are known to include decorative accent lights in the form of illuminated rings extending circumferentially about a centrally positioned functional head lamp. Presently, light pipes are used to form the ring about the functional head lamp, and an incandescent lamp is coupled to the light pipe to direct light therethrough to create a decorative ring of light circumferentially about the head lamp. In order to enhance the decorative appearance of the light emitted from the ring, indentations or ridges are formed in the light pipe. The ridges are typically formed in circumferentially spaced relation to one another about the circumference of the light pipe ring. Unfortunately, the indentations do not provide a uniform decorative appearance of the light emitted from the ring, and further, they increase the complexity of the light pipe manufacturing process, and thus, increase the cost associated therewith. In addition, the emitted light, typically produced from an incandescent source, generally has a yellow-white appearance, and thus, is not considered aesthetically pleasing by some.

SUMMARY OF THE INVENTION

A head lamp assembly having a main functional head lamp and a UV LED light source configured to direct UV light through a decorative accent light pipe is provided. The light pipe extends at least partially about the functional head lamp, wherein the light pipe has a phosphor coated surface that converts the UV light traveling through the light pipe into visible, luminous light. The visible light is emitted from the light pipe to provide the desired decorative appearance about the functional head lamp.

In accordance with another aspect of the invention, the phosphor coating can be provided to emit luminous light of any desired color.

In accordance with another aspect of the invention, multiple phosphor coatings can be provided to emit luminous light of differing colors adjacent one another.

In accordance with another aspect of the invention, a secondary coating can be applied over the phosphor coating to protect the phosphor coating from inadvertent abrasion.

BRIEF DESCRIPTION OF THE DRAWINGS

These and other aspects, features and advantages of the invention will become readily apparent when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
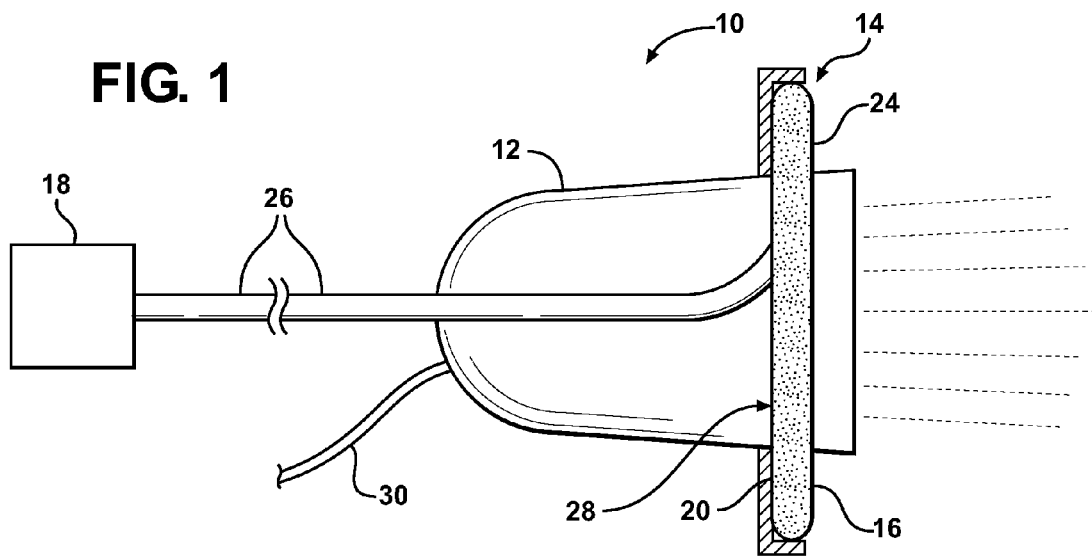
FIG. 1 is a schematic side view of a head lamp assembly constructed in accordance with one aspect of the invention.
Figure 2:
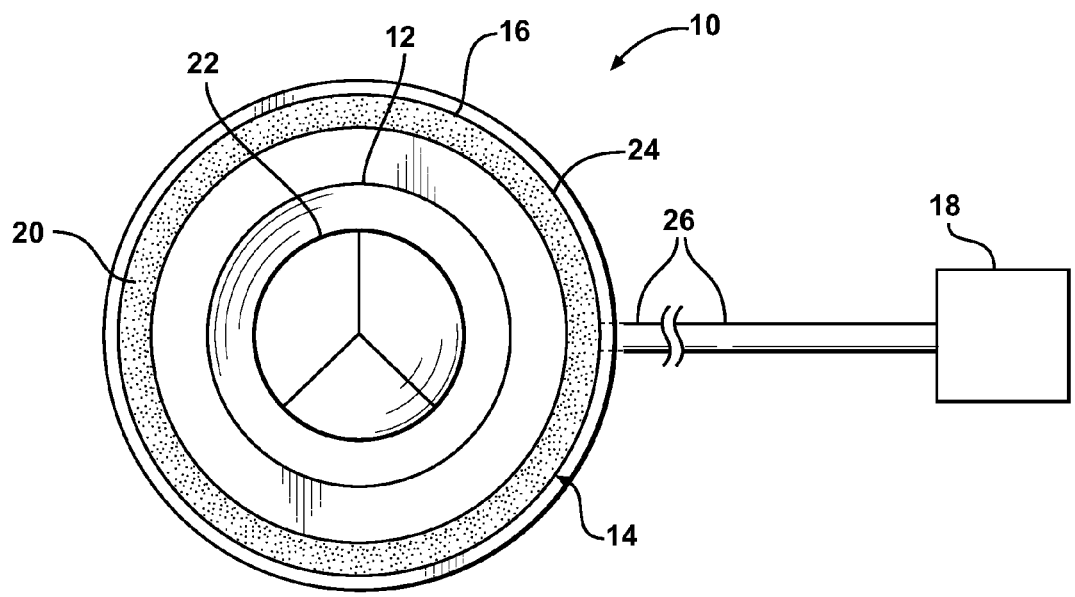
FIG. 2 is a front view of the assembly of FIG. 1.

Referring in more detail to the drawings, FIGS. 1 and 2 illustrate a vehicle headlamp assembly 10 constructed in accordance with one aspect of the invention. The headlamp assembly 10 has a primary functional headlamp 12 to provide the source of illumination of a roadway and a secondary accent light 14 provided in part by a waveguide, also referred to as a light pipe 16. The accent light 14 is configured in communication with a UV LED 18, such that the UV light is transmitted from the LED to the light pipe 16. The UV light is initially invisible upstream from the accent light 14, and is emitted from the accent light 14 as visible light of any desired color. To make the UV light visible, the light pipe 16, through which the UV light travels from the UV LED 18 to the accent light 14, has a phosphor coating 20 applied thereto over the desired areas from which the UV light is to be emitted as visible light. The phosphor coating 20 can be provided in a plurality of formulations to emit any desired color, and can be applied to the light pipe 16 to emit any desired design, whether a solid design, fanciful design or different colors or logo, for example.

The primary functional headlamp 12 can be provided of any suitable size and shape, as desired, depending on the vehicle application, and can have any suitable type and wattage lamp or bulb 22, as desired. The headlamp 12, as commonly known, is attached to a power source via a wire harness 30.

The secondary accent light 14 is constructed to emit a substantially uniform visible light of any suitable color, whether a single color or multiple colors, and design, whether a solid color design or fanciful, decorative pattern. The accent light 14 is represented here, by way of example, as having a light emitting portion, also referred to as a luminescent portion, represented here as an annular or ring-shaped portion 24 encircling the inner, centrally located primary functional lamp 12. It should be recognized that the light pipe 16 could be otherwise configured. The light pipe 16 also has a non-light emitting portion, also referred to as a non-luminescent portion, that functions as a UV light transmission portion 26 that can be constructed as a monolithic piece of material with the ring-shaped portion 24. The transmission portion 26 extends away from the ring-shaped portion 24, wherein the transmission portion 26 is configured of any desired length and shape, as necessary for the intended application, for attachment and/or optical communication with the UV LED 18. Accordingly, it should be recognized that the transmission portion 26 acts to transmit the UV light from the UV LED to the ring-shaped portion 24, wherein the UV light remains substantially invisible through the length of the transmission portion 26. Further, it should be recognized that the transmission portion 26 can be constructed as a separate piece of material from the ring-shaped portion 24, if desired, and that any suitable fiber optic can be used for the transmission portion 26.

The ring-shaped portion 24 can be fabricated using any suitable light pipe material, also commonly referred to as a waveguide, with any suitable manufacturing process, such as molding, extrusion and heat forming, or combinations thereof, for example. The ring-shaped portion 24 can be formed having a uniform, homologous material composition with an uninterrupted, constant cross-sectional pattern or shape, such as circular, for example. As such, the need to provide ridges or indentations within the ring-shaped portion to facilitate emitting the UV light is unnecessary. However, it should be recognized that the ring-shaped portion 24 could be formed having ridges molded therein, if desired.

Figure 1A:
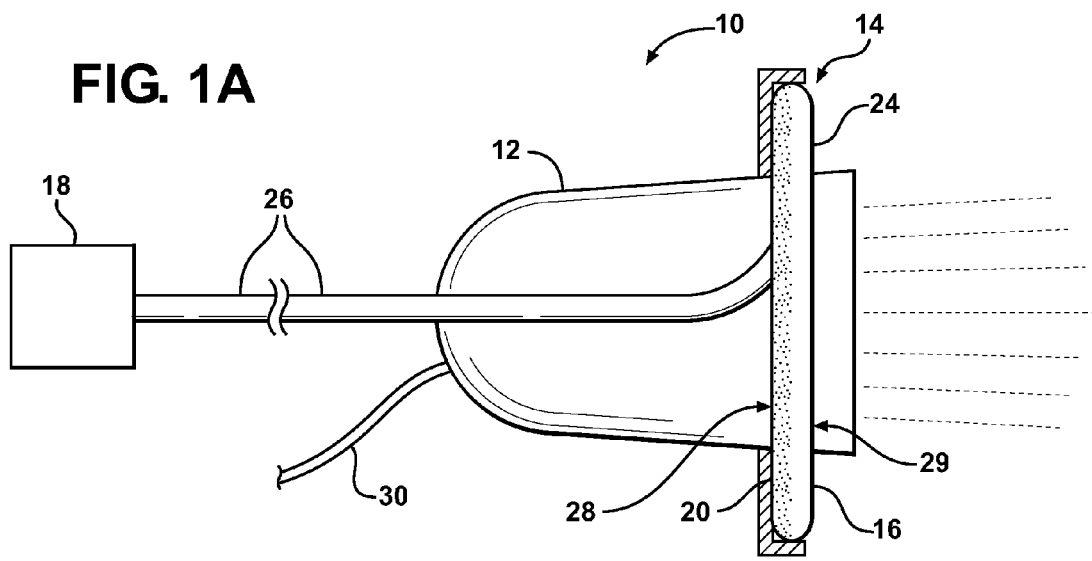
FIG. 1A is a schematic side view of a head lamp assembly constructed in accordance with another aspect of the invention.
Figure 2A:
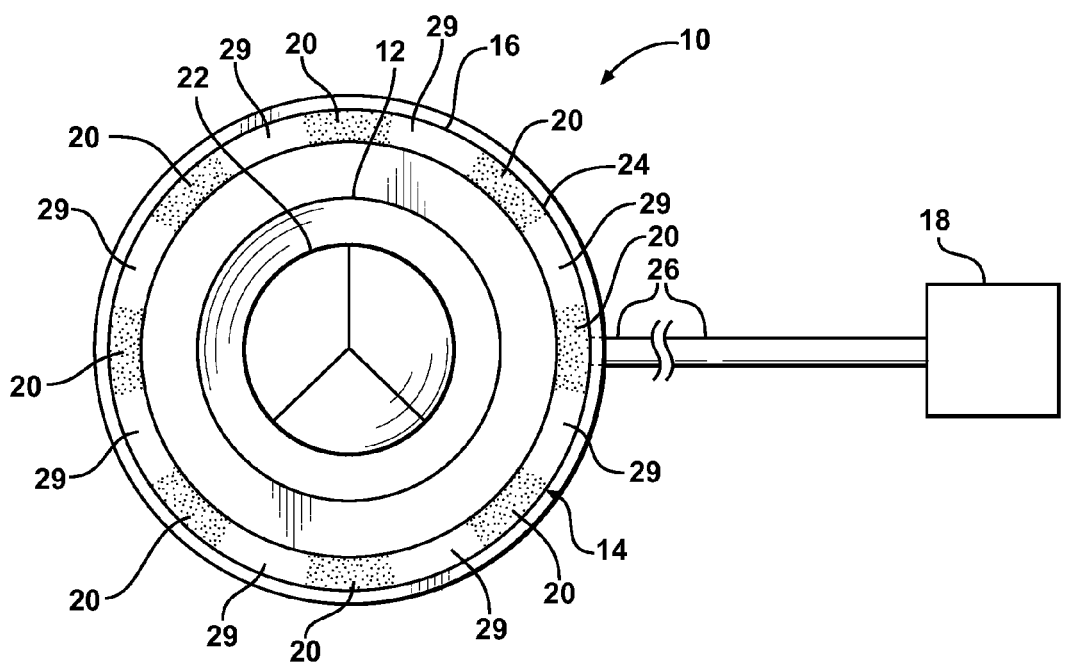
FIG. 2A is a front view of an assembly constructed in accordance with another aspect of the invention.

The ring-shaped portion 24 is coated with the desired phosphor coating 20 to provide the desired luminous design. As noted, any phosphor material or differing formulations/mixtures of phosphor materials can be used to achieve the desired design affect. For example, different formulations of the phosphor coating 20 can be used to emit different colors, whether transitioning gradually from one color to another, or having discrete, separate colors adjacent one another in immediately adjacent or spaced relation to one another. The phosphor coating 20 can be coated over the entire outer peripheral surface of the ring-shaped portion 24, thereby rendering the entire ring-shaped portion 24 visibly luminescent, as shown in FIGS. 1 and 2, or the phosphor coating 20 can be deposited over selected surfaces, such as a rear surface 28 of the ring-shaped portion 24, as shown in FIG. 1A, with a front surface 29 remaining uncoated to avoid potential damage to the coated surface. It should be recognized that the visible luminous light emitted from the coated back surface 28 is transmitted forwardly through the uncoated front surface 29 such that the visible light is viewable from the front of the vehicle. With the coating 20 being limited to the rear surface 28, the potential for damage to the coating 20, such as from direct exposure to oncoming debris and/or airflow, is reduced. Further, the phosphor coating 20, rather than being coated about the full circumference of the ring-shaped portion 24, can be coated over discrete portions of the ring-shaped portion 24, as shown in FIG. 2A. As such, the portions coated with the phosphor coating 20 can be spaced circumferentially from one another by uncoated portions 29, thereby presenting the visibly luminous design pattern, as desired. As such, the phosphor coating 20 renders the selectively coated portions of the ring-shaped portion 24 luminescent, while the uncoated portions 29 of the ring-shaped portion 24, along with the transmission portion 26, remain substantially non-luminescent. As such, the transmission portion 26 functions primarily to transmit the UV light emitted from the UV LED 18 to the phosphor coated portions, thereby optically communicating the UV LED with the ring-shaped portion 24. To protect the phosphor coating 20 from inadvertent scratching or damage, a protective layer or coating can be applied over the phosphor coating. This is particularly beneficial to the configurations having phosphor coating exposed directly to the environment.

Obviously, many modifications and variations of the present invention are possible in light of the above presently preferred embodiments. It is, therefore, to be understood that within the scope of the appended claims, the invention may be practiced other than specifically described above.

What is claimed is:

1. A vehicle head lamp assembly, comprising:
    a functional head lamp;
    a light pipe extending at least partially about the functional head lamp, said light pipe having a uniform, homologous material composition and being free of light enhancing indentations or ridges;
    a UV LED light source configured to emit UV light through said light pipe; and
    a phosphor coating on an outer surface of said light pipe, said phosphor coating being illuminated by said UV LED light emitted from said UV LED light source to provide a decorative ring of light at least partially about said functional head lamp.

2. The vehicle head lamp assembly of claim 1 wherein said light pipe has a luminescent portion and a non-luminescent portion, said luminescent portion having said phosphor coating and said non-luminescent portion being free of said phosphor coating.

3. The vehicle head lamp assembly of claim 2 wherein said non-luminescent portion optically communicates said UV LED light source with said luminescent portion.

4. The vehicle head lamp assembly of claim 2 wherein said phosphor coating is covered by a protective translucent coating.

5. The vehicle head lamp assembly of claim 2 wherein said light pipe forms an annular ring about said functional head lamp and said luminescent portion extends at least partially about said annular ring.

6. The vehicle head lamp assembly of claim 5 wherein said phosphor coating is coated over discrete, circumferentially spaced locations of said annular ring.

7. The vehicle head lamp assembly of claim 5 wherein said luminescent portion extends completely about said annular ring.

8. The vehicle head lamp assembly of claim 7 wherein said annular ring has a rearwardly facing surface and a forwardly facing surface, said rearwardly facing surface having said phosphor coating coated thereon and said forwardly facing surface being free of said phosphor coating.

9. The vehicle head lamp assembly of claim 7 wherein said annular ring is completely coated with said phosphor coating.

10. The vehicle head lamp assembly of claim 1 wherein the phosphor coating includes at least two different formulations of phosphor coating material, said different formulations of phosphor coating material emitting different colors.

* * * * *